Figure 1:
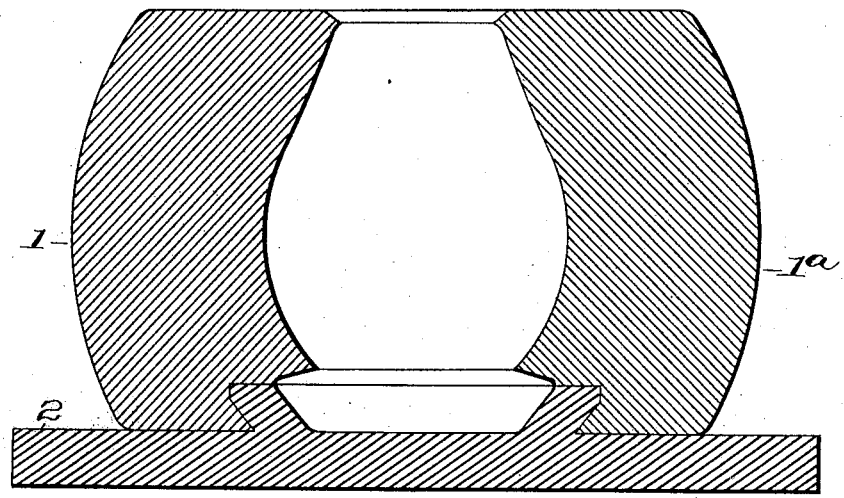

No. 763,758. PATENTED JUNE 28, 1904.
A. B. HOUGHTON.
MOLD FOR THE MANUFACTURE OF LANTERN GLOBES.
APPLICATION FILED DEC. 17, 1902.
NO MODEL.

WITNESSES:
J. M. Fowler Jr.
C. B. Bull

INVENTOR
Alanson B. Houghton
BY
Attorneys.

No. 763,758. Patented June 28, 1904.

UNITED STATES PATENT OFFICE.

ALANSON B. HOUGHTON, OF CORNING, NEW YORK, ASSIGNOR TO CORNING GLASS WORKS, OF CORNING, NEW YORK, A CORPORATION OF NEW YORK.

MOLD FOR THE MANUFACTURE OF LANTERN-GLOBES.

SPECIFICATION forming part of Letters Patent No. 763,758, dated June 28, 1904.

Application filed December 17, 1902. Serial No. 135,527. (No model.)

*To all whom it may concern:*

Be it known that I, ALANSON B. HOUGHTON, a citizen of the United States, residing at Corning, in the county of Stueben and State of New York, have invented a new and useful Improvement in Molds for the Manufacture of Lantern-Globes, of which the following is a full, clear, and exact description, reference being had to the accompanying drawings and to the numerals of reference marked thereon.

My present invention was originally disclosed, but not claimed, in my application Serial No. 68,659, filed June 17, 1901, which application went to patent under No. 717,501, dated December 30, 1902, there having been claimed in said original application both the method covered by said patent and the product forming the subject of an application filed by me of even date herewith, Serial No. 135,528, which issued September 8, 1903, as Patent No. 738,449.

Heretofore, so far as I am advised, a lantern-globe has never been made having a shape or contour conforming to the natural flow of the glass in the curved line of natural expansion under gravity and pressure, the globes prior to my invention having been formed in a mold of a shape contrary to that naturally assumed by the glass during its flow and expansion under the influences of such forces. In other words, the molds heretofore used have been artificial in their shape, producing a globe distorted from the natural conformation assumed by glass blown when at the end of a blowpipe in the open air. The shape naturally taken by the hollow blank of glass when so blown is substantially that of a pear, and heretofore the blank or mass of glass in that shape provided by nature has been placed in a mold of different shape and expanded, so that when the globe has been finished such natural shape has been, under the influences of gravity and pressure, artificially distorted to conform to that of the mold. It has been found, furthermore, in globes heretofore made, especially when they have been formed with an annular bottom flange, which has been erroneously considered necessary in holding the globe in place, that there has been a lack of uniformity in the thickness of the walls of the globe and that the globe has not been of equal density, or, in other words, it has been lacking in homogeneity, these defects being caused in part by the distorting effect of the mold employed and also by the excess of pressure required to carry the glass past the sharp angle produced at the union between the bottom flange or ring and the lower curved portion of the globe, the angle obstructing the natural flow and expansion of the glass and causing a choking of the glass at such point of union. The flange or ring has therefore proved a source of weakness, which is explainable in various ways, one of which is that the ring is subjected to strain on the outside because its surface is compressed and on the inside because its surface is stretched; but whatever the explanation such a ring at the bottom or lower edge of the hollow body of glass substantially globular or oviform or of the somewhat different shape given according to my invention must necessarily, because of the existence of certain conditions, tend to greatly weaken and shorten the life of the globe. For example, the pressure required to blow the glass forming such flange or ring into the part of the mold necessary to form it is greatly in excess of that required to blow the globe without it, especially when, as in my invention, the glass follows its natural course in the mold, to effect which action hardly any pressure (comparatively speaking) is needed, and it will be readily seen that a globe having natural lines of curvature without an angular break in such curvature must have walls of equal thickness throughout and of the same density (homogeneity) of substance, there being no disturbance of the molecular conditions such as must exist where the walls of the globe are not shaped in natural lines of curvature. Furthermore, it will be seen that in blowing globes having an obstructing angle diverting the natural flow and expansion of the glass the pressure necessarily cannot be uniform, for in carrying the glass past such angle a sudden increased pressure is needed not required in forming the remaining portions of the body of the globe.

In constructing my improved lantern-globe (as described and claimed in my application of even date herewith, Serial No. 135,528, patented, as aforesaid, under No. 738,449) I avail myself of conditions which have been discovered by me after much experimentation and test, the result of which has been the production of a globe capable of withstanding great diversity of temperatures, ranging from many degrees below zero to a high degree of natural atmospheric heat and to the heat due to the flame, as well as the sudden and almost endless variations of temperature, the destructive action of the elements, as of wind, rain, snow, &c., and the rough usage to which such a lantern-globe is subjected, the product described in said other application filed herewith having throughout its entire body the greatest attainable degree of strength, which is uniform in all parts thereof and is deprived of structural weakness at all points.

Figure 2:
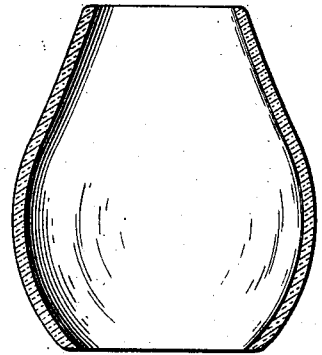
Figure 3:
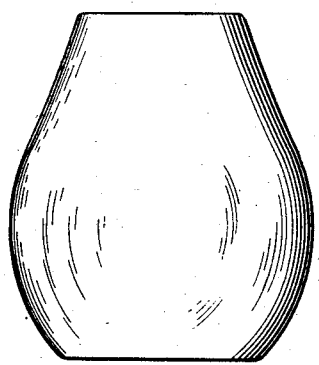

In the accompanying drawings, Figure 1 is a sectional view illustrating a mold capable of being employed in conducting my invention. Fig. 2 is a section, and Fig. 3 an exterior view, of my improved globe.

Similar numerals of reference indicate similar parts in the respective figures.

In Fig. 1 is seen a section of a two-part mold used in producing my improved lantern-globe, 1 and 1ª showing the wall structure, and 2 the base-plate. The lines of curvature of the walls of the mold are of the same shape as the lines of curvature naturally followed by the glass when flowing and expanding under the influences of gravity and air-pressure, so that the glass received by the mold is not shaped thereby, but, more properly speaking, is limited in size and in degree of expansion by the walls of the mold. Therefore the term "mold" here conventionally retained does not in its more ordinary sense apply to the expedient used by me, which is rather a size-controller than a shape-producer.

The results, as above stated and in consequence of the omission from the mold of the shoulder or projection required in the formation of the usual lower flange or ring, are that the flow or expansion of the glass is natural and unimpeded, the walls of the globe are kept uniform in thickness, and therefore of equal strength at all points, and that the same solidity or density of glass due to lack of disturbance of molecular conditions is maintained at all parts. The "blow-over," as will be understood, extends above the mold, while the thin surplus of glass is formed in its base, both of which extraneous bodies of glass are removed, as is well understood in this art.

Inasmuch as standard authorities define the word "mold" as "anything which serves to regulate the size, form, &c., as of articles made by mechanical skill," (see Webster,) the word is retained in the claims.

Having thus described my invention, I claim—

1. A mold for a lantern-globe, said mold having walls which follow the natural lines of curvature produced in the blank under the influences of gravity and expansion under air-pressure, substantially as specified.

2. A mold for a lantern-globe, said mold having walls which follow the natural lines of curvature produced in the blank, in blowing, under the influences of gravity and expansion by air-pressure, substantially as specified.

3. A mold or size-controller for a lantern-globe, said mold having walls which follow the natural lines of curvature produced in the blank, in blowing, under the influences of gravity and expansion under air-pressure, the incurved bottom portions of said walls being of uninterrupted curvature, substantially as set forth.

In witness whereof I hereunto set my hand and seal.

ALANSON B. HOUGHTON. [L. S.]

Witnesses:
 WILLIAM SINCLAIRE,
 WILLIAM J. TULLY.